UNITED STATES PATENT OFFICE.

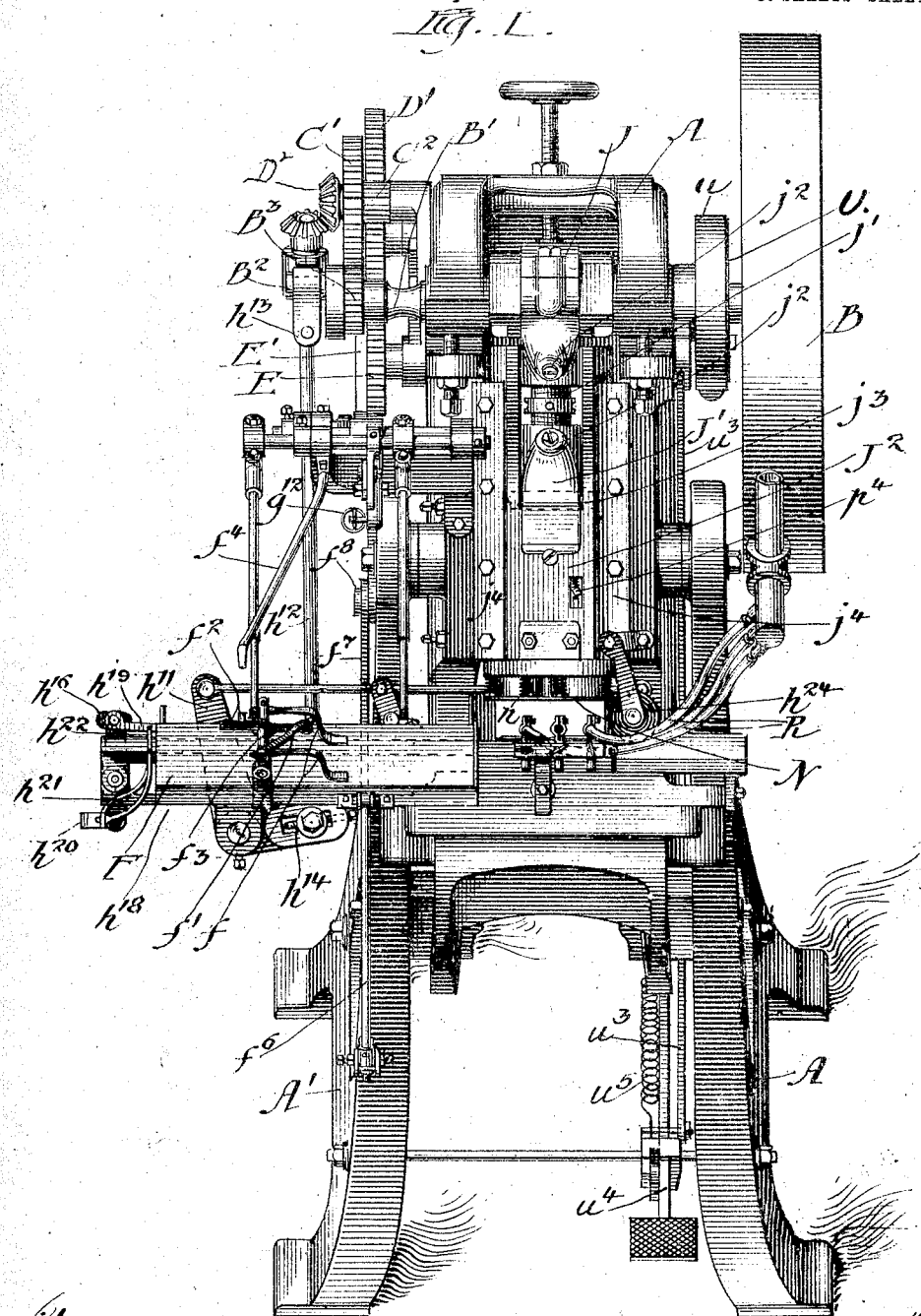

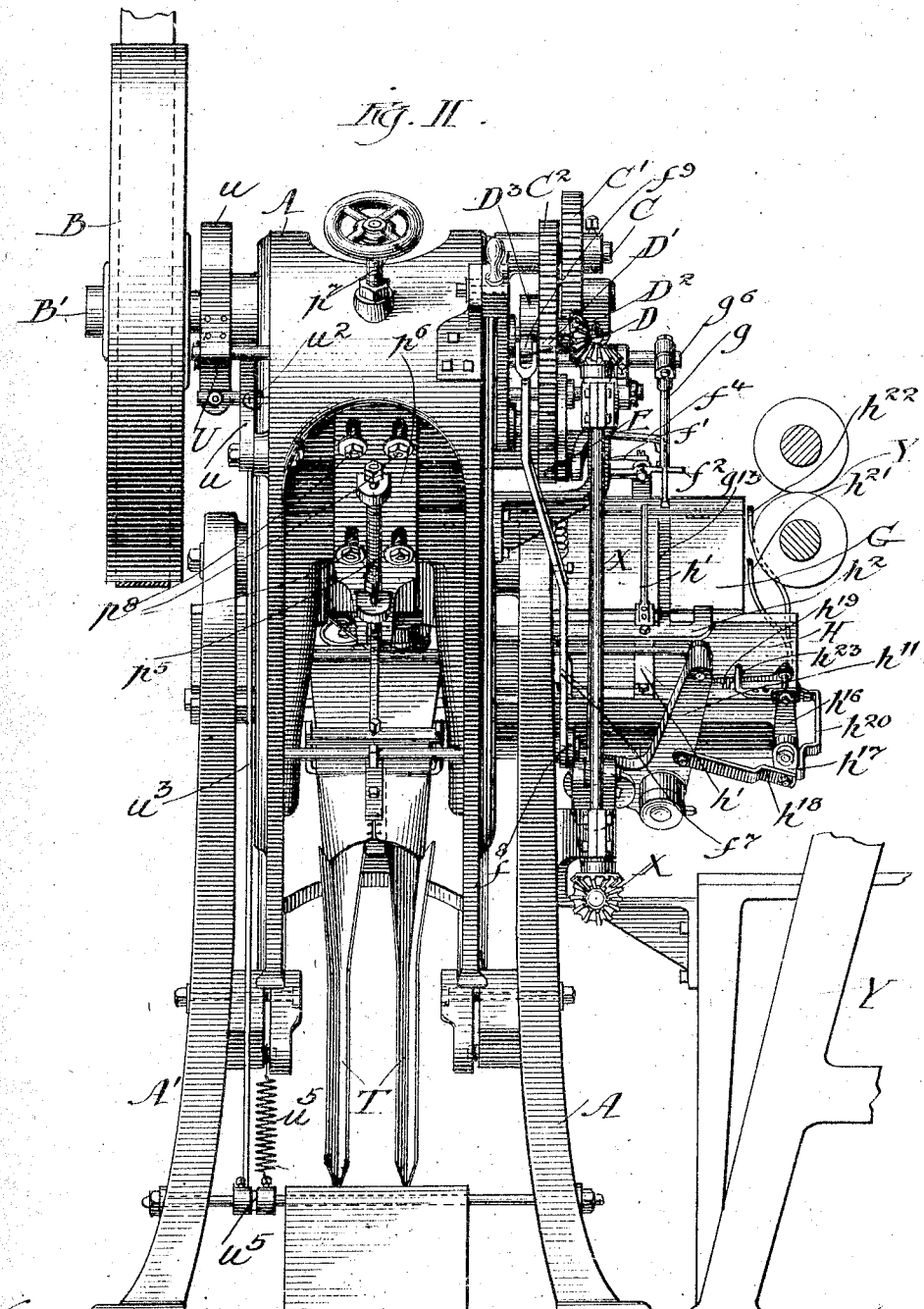

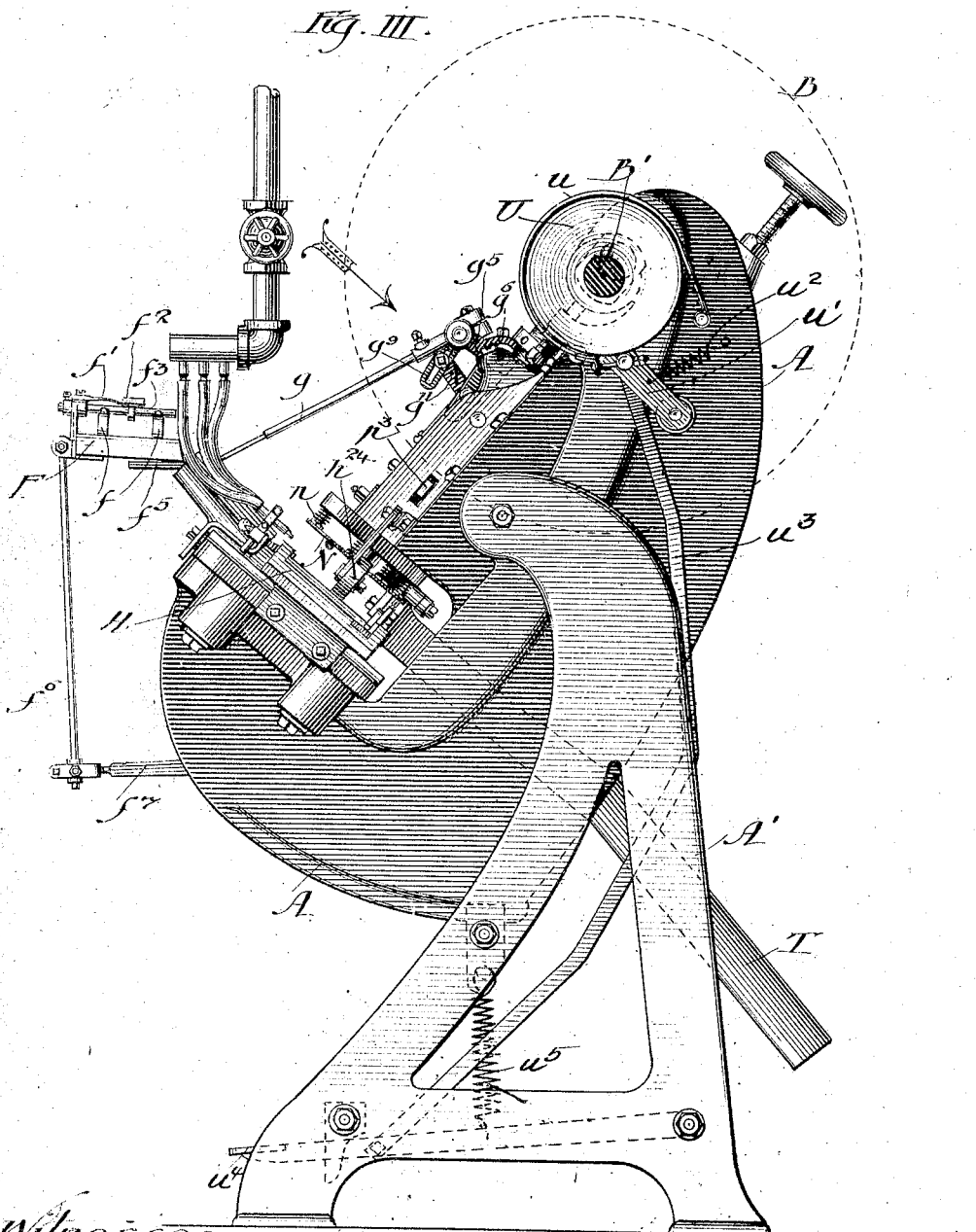

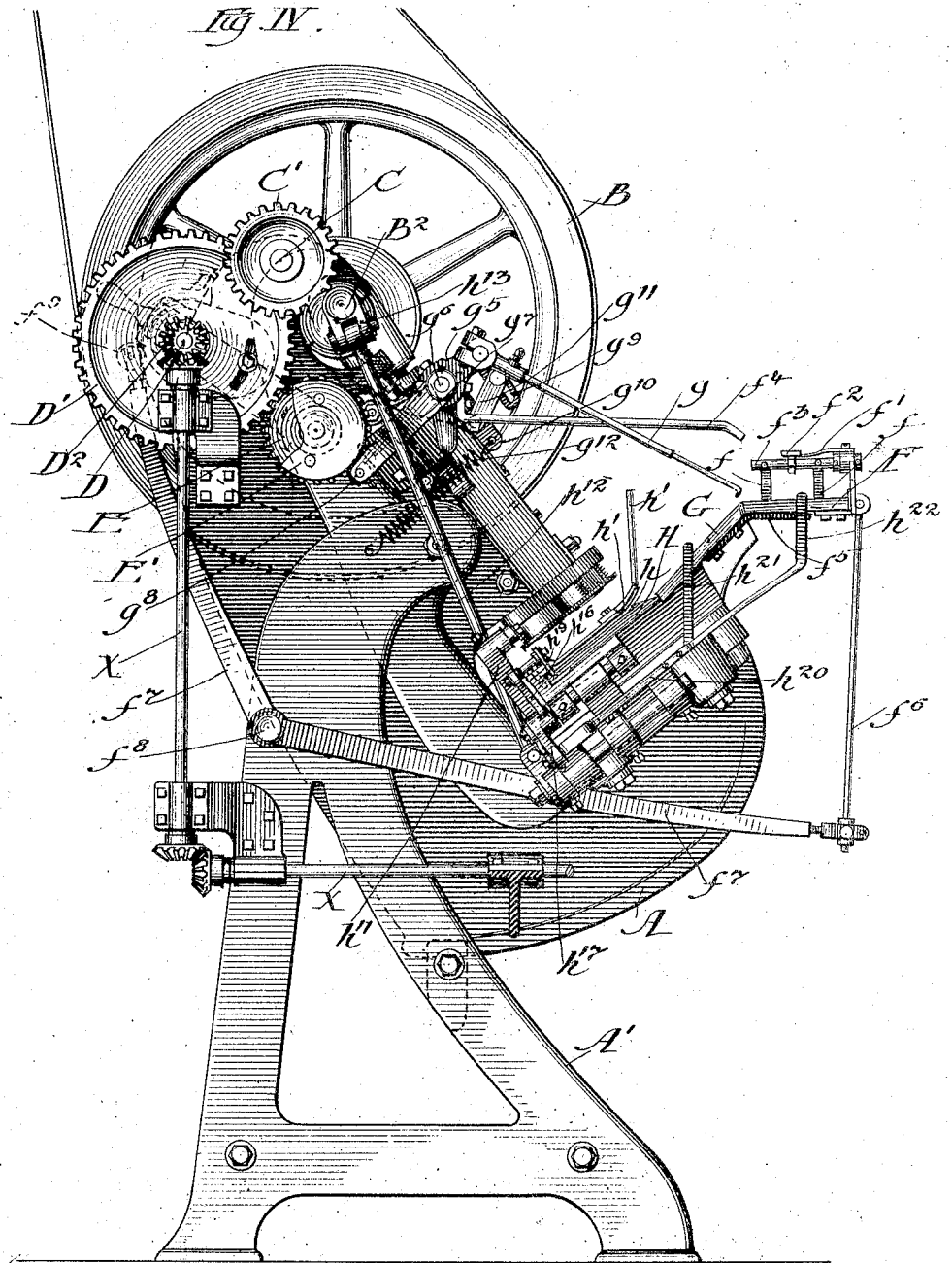

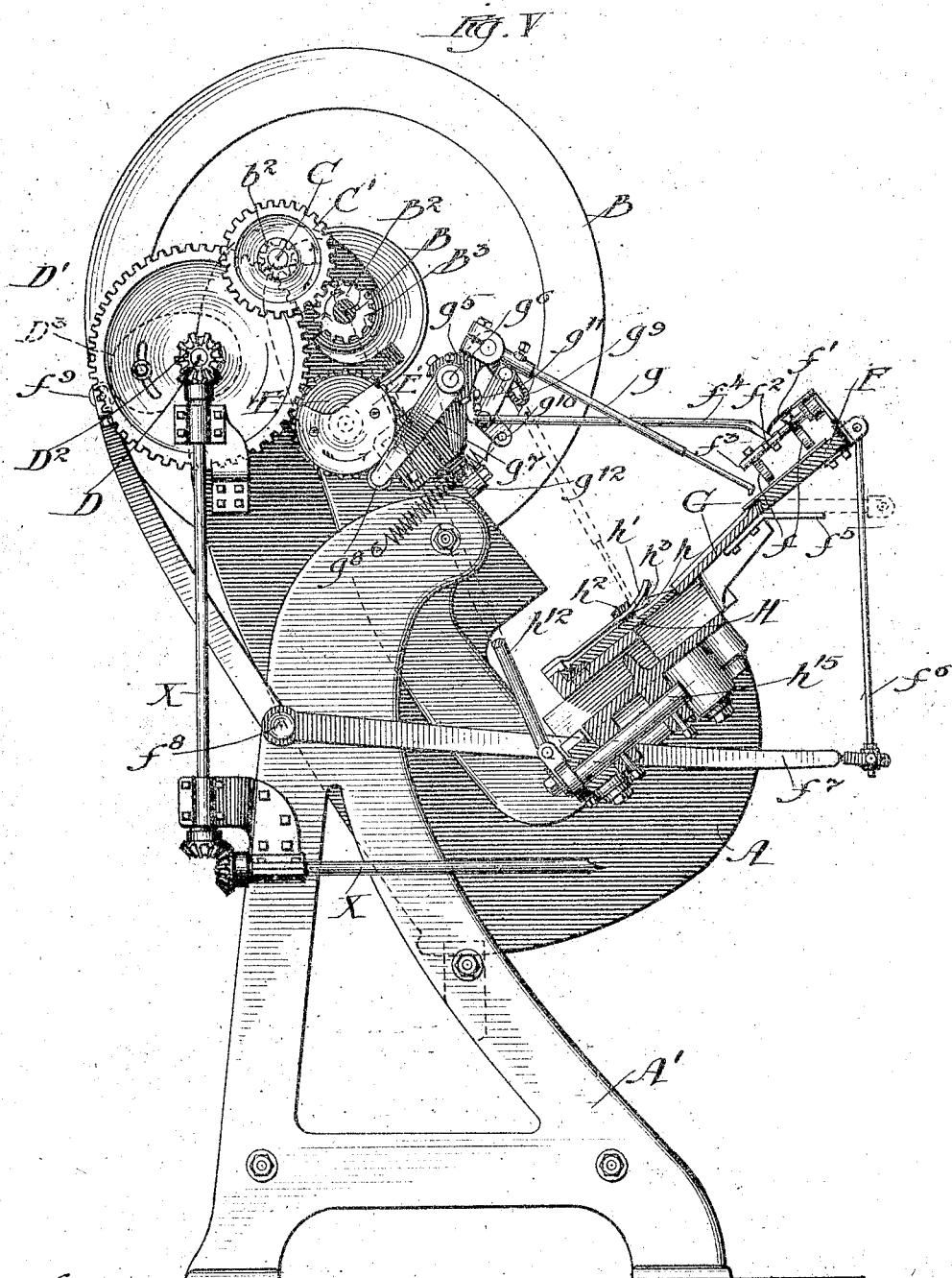

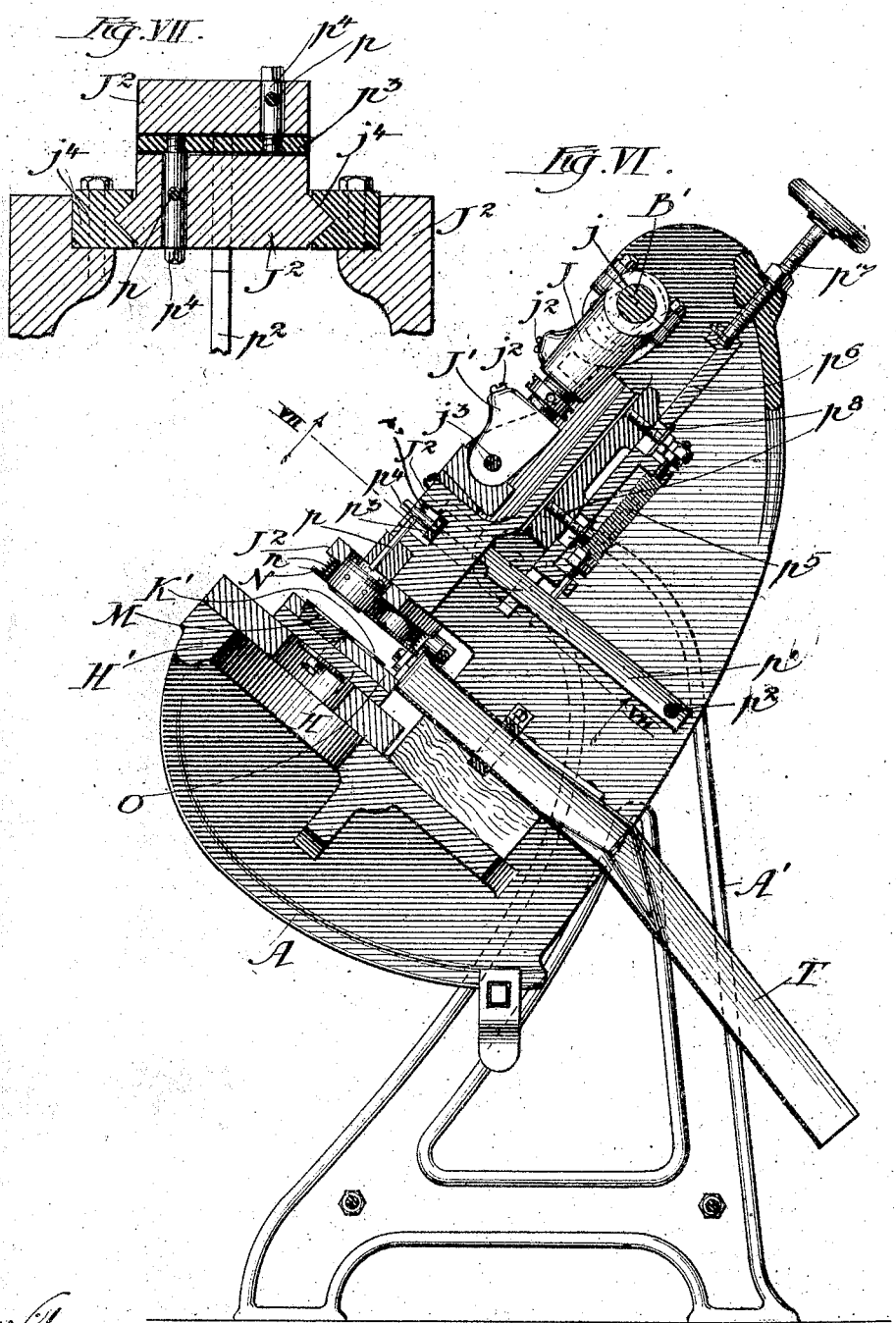

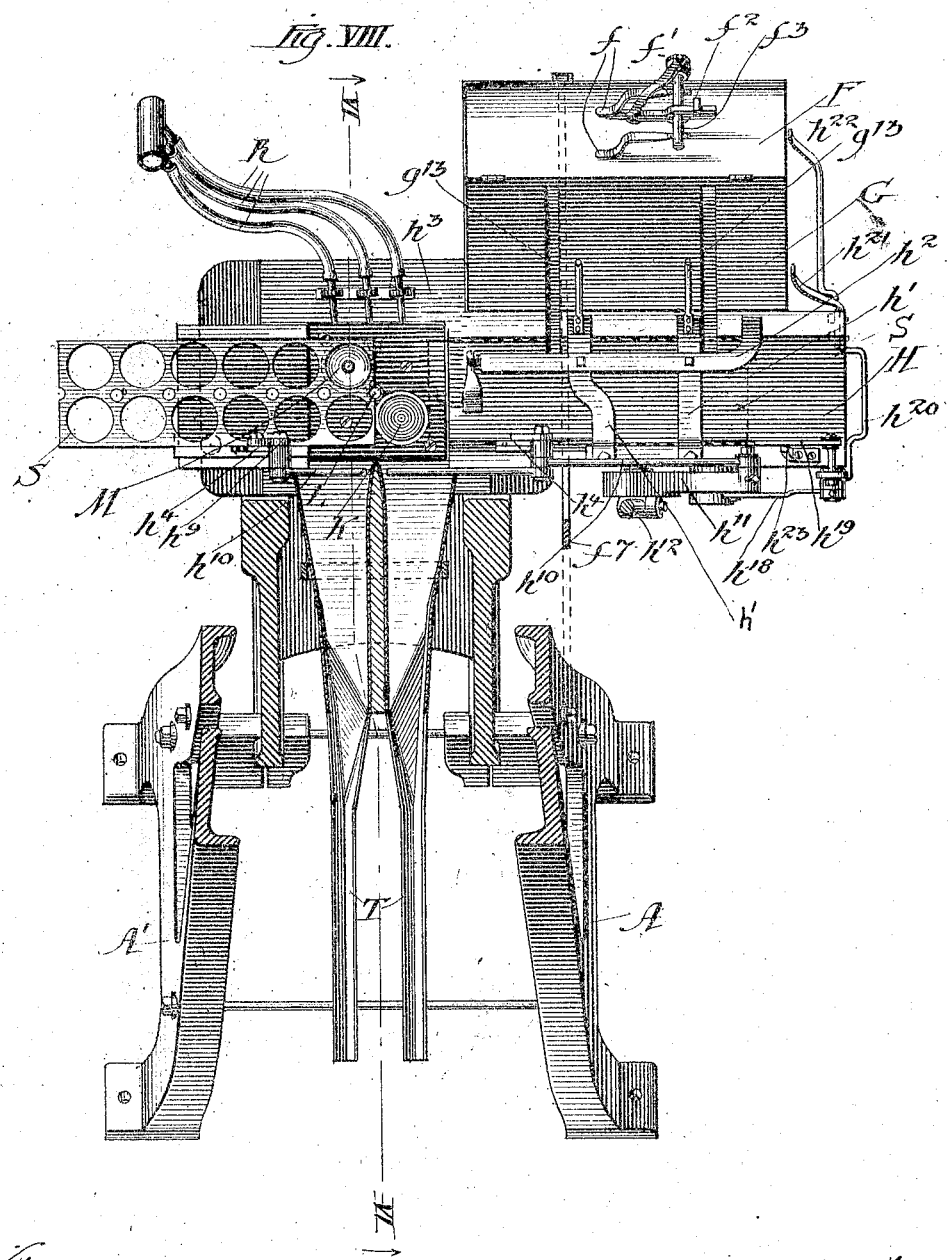

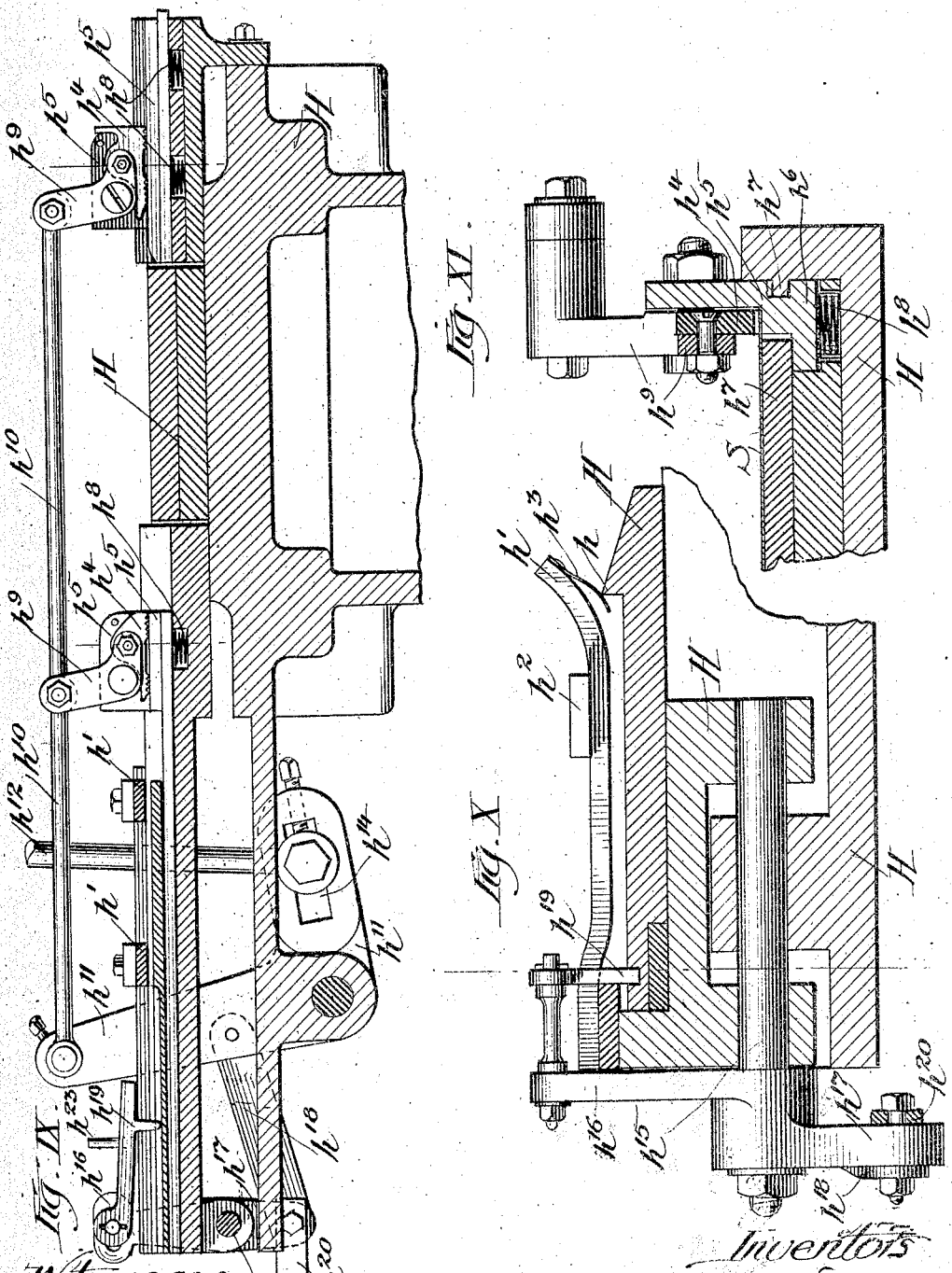

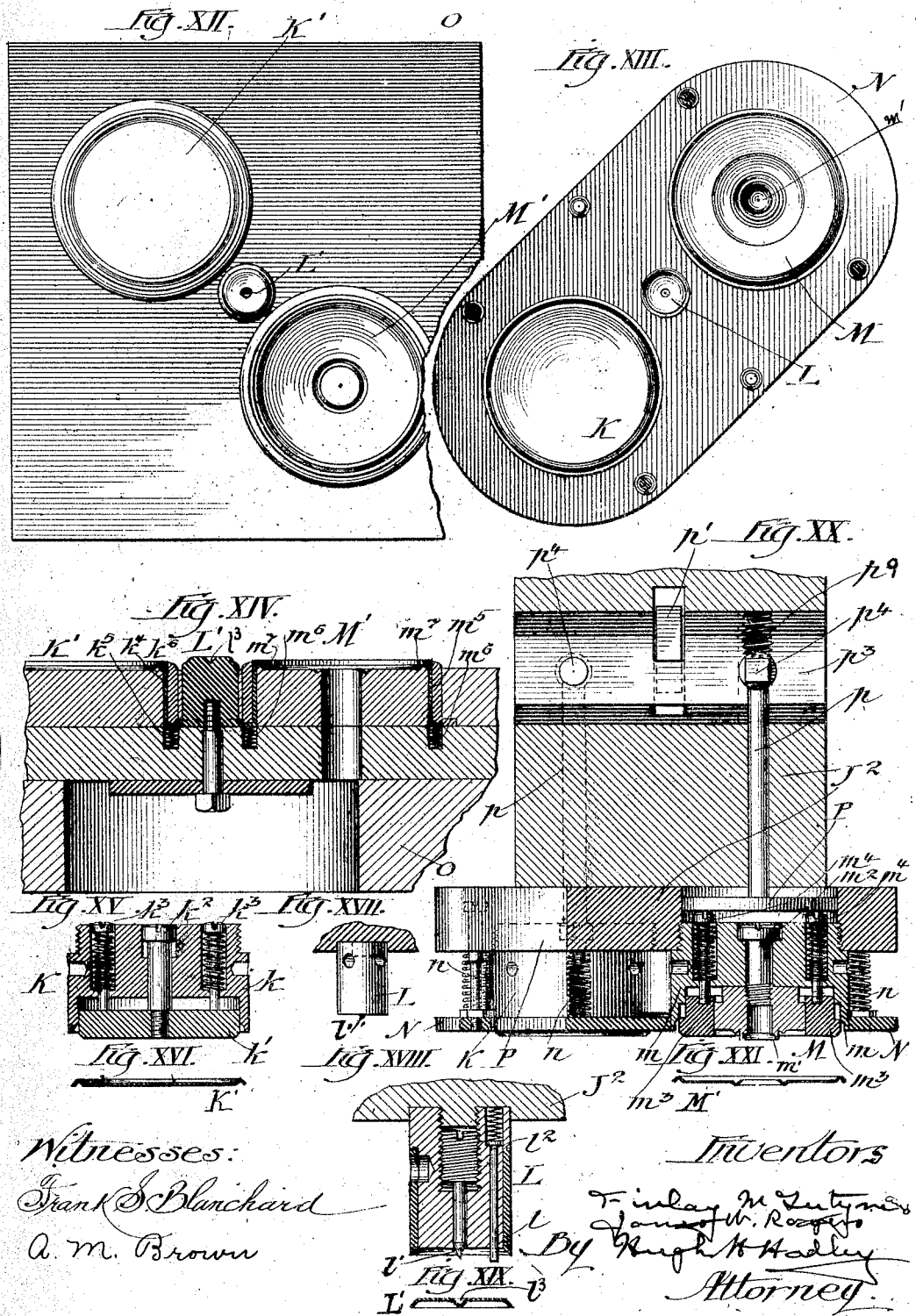

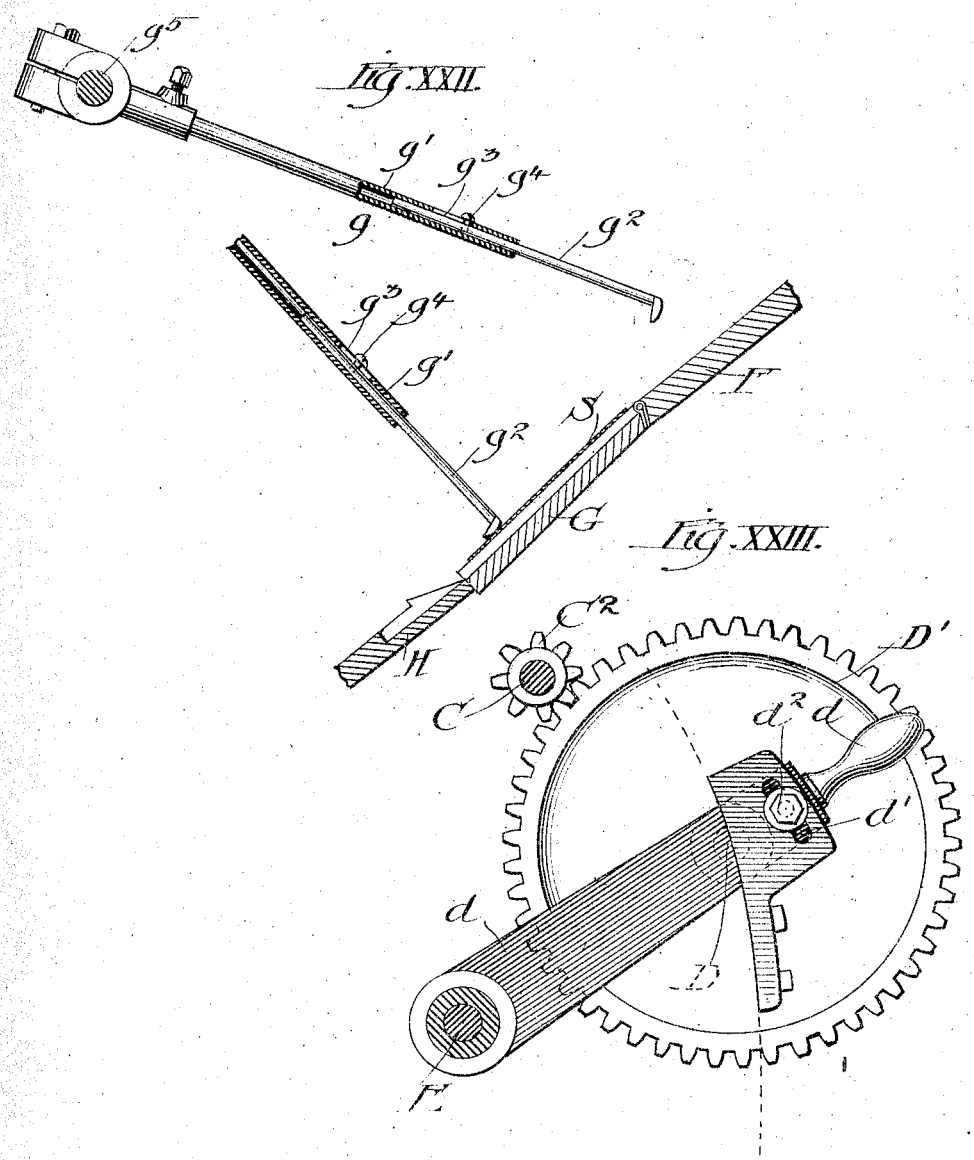

FINLAY McINTYRE AND JAMES W. ROGERS, OF CHICAGO, ILLINOIS; SAID ROGERS ASSIGNOR TO SAID McINTYRE.

PUNCHING-MACHINE.

No. 923,198.      Specification of Letters Patent.      Patented June 1, 1909.

Application filed September 14, 1906. Serial No. 334,674.

*To all whom it may concern:*

Be it known that we, FINLAY McINTYRE and JAMES W. ROGERS, of Chicago, in the county of Cook and State of Illinois, have invented certain new and useful Improvements in Punching-Machines; and we do hereby declare the following to be a full and exact description thereof, reference being had to the accompanying drawings.

This invention relates to machines for stamping blanks from sheets of metal, paper, felt or any material suitable for die cutting, and has special reference to machines for stamping ends for tin cans.

The present methods of cutting can heads are crude, in that the most generally utilized method employed is that of stamping one head at each operation of the machine. This slow method is used even after long and diversified experiments. The economy of the stock is the one necessity which all manufacturers concede. The construction of dies is of such a nature that in order to construct them in a gang, too much space must be left between each two to make it practical on account of the loss of stock. Construction of dies in gangs has been attempted, wherein sufficient space is left between each two dies so that the sheet may be reinserted for another operation between the holes in the sheet left by the first operation, but the great expense of construction and great loss of time in upsetting them have proven this method of the construction of dies objectionable. The method generally followed is the punching of one blank at a time.

Our invention comprehends an arrangement of dies in a row and conserves the stock by the manner in which we show the dies to be arranged in relation to the line in which the sheet is fed.

Our invention consists first in the mechanism for handling two or more sheets of tin plate or other material in a punching press at one time.

Our invention consists second in the mechanism by which sheets of metal and other material may be fed through a stamping press.

Our invention consists third in the arrangement of punching dies in a row and the feeding of a sheet of metal obliquely to the said row of dies.

Our invention consists fourth in the mechanism for ejecting blanks from the cutting dies after the cut is made.

Our invention consists fifth in the mechanism by which certain relative movements are secured between the feeding and stamping mechanism of our invention.

Our invention consists sixth in the various novel devices and combinations of the same herein illustrated and described, together with their mechanical equivalents, and pointed out with more particularity in the claims appended hereto.

In the drawings, Figure I represents a front elevation of our machine, viewed in the direction indicated by the arrow shown in Fig. III. Fig. II is a rear elevation of our machine. Fig. III is a view of the right side of our machine with the belt pulley removed. Fig. IV is a view of the left side of the machine. Fig. V is also a view of the left side of the machine, but with certain parts removed. Fig. VI is a perpendicular sectional view of our machine from the right side, taken through the center. Fig. VII is an enlarged detail of our ejector, viewed from a sectional view of Fig. VI, taken on line VII. Fig. VIII is a plan view of our feeding mechanism showing the machine frame in section. Figs. IX, X and XI are enlarged details of our feeding mechanism. Figs. XII to XXI inclusive are enlarged details of our punching dies. Fig. XXII is an enlarged detail of our feeding mechanism, and Fig. XXIII illustrates our method of adjusting the gears to care for the different size sheets to be stamped.

More particularly described, A represents the frame of our machine, supported by standards A' A'.

B represents the belt pulley from which the power is received, and B' the driving shaft to which said pulley B is attached. On the opposite end of the driving shaft B' is fixed the crank pin $B^2$ from which power is transmitted to part of the feeding mechanism as hereinafter described. Upon the driving shaft B' and adjacent to the crank pin $B^2$ is fixed the gear $B^3$. This gear $B^3$ meshes with gear C' fixed upon the shaft C. Also fixed upon the shaft C is the smaller gear $C^2$ which meshes with and transmits power to the gear D'. Upon the shaft D of the gear D' is fixed a bevel gear $D^2$ which engages with the shaft X, by which it is designed to transmit power to the machine Y Y for slitting sheets of metal to the desired size. The gear D' carries a cam D³ from which power is transmitted to certain parts of the feeding mechanism as hereinafter described. The gear D' meshes with another gear E which carries a cam E' which controls still another movement of the feeding mechanism.

By our feeding mechanism we desire to be enabled to handle two or more sheets of metal, or a sheet slit into two or more strips, and carry the strips one after another to the machine, into which they must be fed in close succession, and with great accuracy in order to avoid waste, which is highly essential in handling expensive material such as tin plate and the like. Our feeding mechanism consists first of three tables F, G and H. H is the feed table proper and from it the sheets S are fed under the stamping dies. It is stationary and is secured to the body of the machine. The table G is in effect an extension of table H and is designed to hold the sheet next to be fed into the dies. It slopes slightly upward from the front of the machine, as does also the table H. The table F is hinged to the table G and is adapted to be elevated to the same angle as that of the tables H and G, see Fig. V, or to be lowered to a horizontal position, see Fig. IV. Upon the table F are fixed the retaining fingers $f$, $f$, which are held normally against the table F by the spring $f'$. The arm $f^2$ engages the spring $f'$ and is fixed with the fingers to the shaft $f^3$, projects beyond the center of the shaft $f^3$, and is adapted to raise the fingers $f$, $f$, from the table F when pressure is placed upon its outer end. To the frame of the machine A, we fix the arm $f^4$ in opposition to the outer end of the small arm $f^2$. When the table F is in a horizontal position, as at Fig. IV, the spring $f'$ acts to keep the retaining fingers on the table F. When however as in Fig. V, the table F is elevated to a parallel with the tables H and G, the arm $f^4$ engages the arm $f^2$ and the fingers are raised from the table F, thereby releasing the sheet of metal held thereon, allowing it to slide upon the table G. A strap $f^5$ is secured to the table G and affords a support for the table F when in a horizontal position. Power is transmitted to the table F through the arm $f^6$ and the bell crank lever $f^7$, pivoted to the machine at $f^8$ and engaging with the cam D³ at its free end to which the roller $f^9$ is affixed.

The table G is designed as before mentioned to hold the sheet next to be fed into the dies. It has no retaining fingers as described at $f$ $f$ on table F, but the sheet is held on table G by means of stops arranged on table H and described hereinafter. Table H is arranged with a bed to guide the alinement of the sheet S which has for its outer guide the shoulder $h$, formed with a right angle shoulder on the side of the table bed H and with a sloping side toward the table G. Arms $h'$ $h'$ connected by the cross arm $h^2$ are arranged to guide the sheet S onto the table H. Affixed to the arms $h'$ $h'$ are small springs $h^3$, $h^3$ which engage the shoulders $h$, $h$, and serve as a stop to normally hold the sheet S on the table G. In the operation of the machine, in moving a sheet from table G onto table H, it must be forced against the action of the springs $h^3$. For this purpose we provide fingers $g$, $g$, which pass across the face of the table G within the channels $g^{13}$ $g^{13}$ and force the sheet against the springs $h^3$ beneath the arms $h'$ $h'$ and onto the bed of the table H. The fingers $g$ are constructed of outer and inner telescoping sections $g'$ and $g^2$ respectively. $g'$ is fitted with a slot $g^3$ closed at both ends, and within this slot a pin or screw $g^4$, secured to section $g^2$, is allowed to slide, see Fig. XXII. The purpose of this construction is to prevent breakage in case a sheet or foreign object should get caught beneath the said fingers $f$ $f$ on the table G; see Fig. XXII. These fingers $g$ $g$ are rotatably secured to the frame of the machine by an arm $g^5$ at shaft $g^6$, which shaft is fitted with a crank $g^7$ which engages by a roller $g^8$ at its free end with the cam E'. The slotted arm $g^9$ attached to the finger $g$, the arm $g^{10}$ attached to the shaft $g^6$ and the arm $g^{11}$, rotatably attached to the arm $g^{10}$ and adjustably attached to said slotted arm $g^9$ furnish means of adjusting the fingers $g$, in their engagement with the table G. A spring $g^{12}$ connects the arm $g^{10}$ with the machine and holds the crank roller $g^8$ in contact with the cam E'. Upon the table G we provide channels $g^{13}$ $g^{13}$, wherein said fingers $g$ $g$ are designed to move below the surface of the table G. This construction minimizes the chance of the fingers $g$ $g$ engaging the sheet S on top instead of beneath.

From the table H the sheet S is fed laterally into the dies. The arms $h'$ $h'$ and $h^2$ have been described as intended to guide the sheet on to the table H. Upon one end of the cross arm $h^2$ we fix a small pressure finger $h^3$ which is intended to hold the sheet smoothly upon the table H. The mechanism by which the sheet is moved laterally into the dies is described as follows:—Serrated dogs $h^4$ $h^4$ are rotatably secured to angle blocks $h^5$ $h^5$, with the angle faces of which they coöperate. The angle blocks $h^5$ are fitted at their lower side with T shaped guides $h^6$, see Fig. XI, which are designed to slide loosely within a suitable recess in the bed of said table H. Shoulders $h^7$ $h^7$ of said table engage said guides $h^6$ and hold the blocks $h^5$ $h^5$ within the said recess. Small springs $h^8$ $h^8$ are embedded in said table bed in opposition to the bottom face of the said blocks $h^5$ $h^5$ for the purpose of lifting the blocks free from contact with the said table H and permitting free movement of said blocks along said table H.

The sheet S is gripped between the dogs $h^4$ $h^4$ and the angle blocks $h^5$ $h^5$, see Fig. XI, and in operation, the springs $h^8$ $h^8$ in lifting the T shaped guides $h^6$ $h^6$ of said block $h^5$ free from the bed, the gripping point of said dogs and block are elevated above the plane of the said table and the sheet S is raised out of contact therewith, overcoming the friction of the sheet dragging on the table H.

The serrated dogs $h^4$ $h^4$ are rotatably secured to the free end of the bell crank levers $h^9$ $h^9$. The angle blocks $h^5$ $h^5$ are also secured to the levers $h^9$ $h^9$ at the fulcrum point. By the operation, therefore, of the levers $h^9$ $h^9$ the dogs $h^4$ $h^4$ are made to engage with and disengage from the angle blocks $h^5$ $h^5$. The levers $h^9$ $h^9$ are connected by the connecting rods $h^{10}$ $h^{10}$ with the bell crank lever $h^{11}$, which in turn is connected with the connecting rod $h^{12}$. The rod $h^{12}$ is attached to the crank pin $B^2$ by a yoke $h^{13}$ to allow for lateral movement caused by the action of the crank pin $B^2$. One arm of the lever $h^{11}$ is slotted at $h^{14}$, and the rod $h^{12}$ is adjustably connected therewith as shown in Fig. IX. A rock shaft $h^{15}$ is secured to the end of the table H and secured to said shaft are crank arms $h^{16}$ and $h^{17}$. The arm $h^{17}$ is connected with the lever $h^{11}$ by the connecting rod $h^{18}$ and the arm $h^{16}$ is adjustably connected with a dog $h^{19}$ which rests upon the table H in opposition to the rear end of the sheet S. To the arm $h^{17}$ is secured the spring arm $h^{20}$ which carries the fingers $h^{21}$ and $h^{22}$ which engage the rear end of the sheet S lying on the tables G and F respectively. The guide $h^{23}$ secured to said table H serves to hold the dogs $h^{19}$ in place on said table H.

A roller $h^{24}$ fixed to the frame of the machine lies upon the table H and holds the waste in place until the entire sheet is stamped.

In operation, the power is transmitted from the crank pin $B^2$ on the driving shaft B' through the connecting rod $h^{12}$ to the lever $h^{11}$, which is made to rock, carrying the dogs $h^4$ $h^4$ and the blocks $h^5$ $h^5$ forward and back along the table H. The sheet S is gripped and carried along the table under the dies in the forward movement and then released from the grip for the backward movement. At the same time the dog $h^{19}$ and the fingers $h^{21}$ and $h^{22}$ are made to strike the rear end of the sheet S on the tables H, G, and F respectively and keep them in an advanced position.

The reciprocation between the action of the feeding dogs $h^4$ $h^4$ and their coöperating blocks $h^5$ $h^5$ and the action of the table G is such that the succeeding sheet S is forced on to the table H by the fingers $g$ $g$, at such a time that the ends of the said succeeding sheet S, and the sheet S under operation will lie such a distance apart as to allow the complete stamping of one sheet before the succeeding sheet passes under the dies, the intent being to have the succeeding sheet engage the dies in the next succeeding operation after the preceding sheet has been wholly stamped. This succession is shown in Fig. VIII. In the drawing the preceding sheet S is shown receiving its last impression, and the succeeding sheet S is shown in dotted lines on the table H abutting next to the nearest die, ready to be received by the dies in the next operation of the punching mechanism. The purpose of this spacing between the sheets S in feeding them under the dies, is to prevent sheets of different thickness passing under the dies at one time, and to prevent the successive sheets overlapping, in either of which cases the dies would be in danger of mutilation.

The stamping mechanism of our machine is described as follows: A driving arm consisting of two parts J and J' transmits the power to the die head $J^2$ to which are secured the male dies K, L and M. The part J is connected by a crank $j$ to the driving shaft B'. The parts J and J' are connected by an adjusting screw $j'$ which is secured at its opposite ends by the set screws $j^2$ $j^2$. The part J' is hinged to the head $J^2$ at $j^3$. The head $J^2$ is adapted to slide within guides $j^4$ $j^4$ secured to the frame of the machine A and carries upon its lower end the dies K, L and M as above named.

The stamping dies consist of the male dies K, L and M, and their coöperating female dies K', L' and M', and are described as follows:—The die K consists of a cutting portion $k$, which is preferably screwed into the die head $J^2$. An ejector $k'$ is secured to the cutting portion $k$ by a screw $k^2$ which is designed to slide within said cutting portion $k$ and the head of which is counter sunk within the upper face of said cutting portion $k$. Spring seated posts $k^3$ $k^3$ are secured to said ejector $k'$ and the rest in suitably designed counter sinks in the upper face of the cutting portions $k$. The spring posts $k^3$ $k^3$ hold the ejector $k'$ normally retired within the cutting portion thereof, and hold the screw $k^2$ and the posts $k^3$ $k^3$ above the upper face of the cutting portion $k$.

The die L consists of a circular cutting portion $l$ within the center of which is secured a pointed punch $l'$, the point of which extends slightly below the cutting surface of said portion $l$. A spring seated ejector is fitted in the head $J^2$ and is designed after the blank is stamped to strike it from the die to which it is held by the friction of the cutting portions. This form of die is designed to stamp the caps for the tops of tin cans, and the pointed punch $l'$ is designed to form a small air hole in the center of the cap, to be afterward closed with solder or other seal.

The die M is constructed much the same as the die K except that it has a center punch. This die is intended to stamp the tops of tin cans, while the die K is intended for the bottoms. The cutting portion $m$ is of the same construction as $k$, hereinbefore described, and is likewise screwed into the head $J^2$. Within the center of this cutting portion $m$ however is placed a punch $m'$ which is secured to the cutting portion $m$ by the screw $m^2$. Around the punch $m'$ and between it and the cutting edges of the portion $m$ lies the ejector $m^3$ in the shape of a ring. This ejector is secured to the cutting portion $m$ by spring seated posts $m^4$ $m^4$, which normally hold the ejector $m^3$ away from the cutting edges of $m$ and $m'$ and the heads of the posts $m^4$ above the upper face of the portion $m$. The dies K, L and M are all surrounded by a pressure frame N which is secured to the die head $J^2$ by spring seated posts $n$ $n$, the heads of which posts are seated within counter sunk recesses in said die head $J^2$. These spring seated posts hold the pressure frame N normally in a position below the dies K, L and M, and N is designed to hold the sheet S in position for stamping until the said dies strike the sheet, when the frame N is moved upward against the action of the spring posts $n$ $n$, allowing the dies to make the cut.

The dies K′, L′ and M′ are seated upon a bed O and are provided with yielding rings seated upon the springs $k^5$ and $m^6$ allowing the rim of the stamped blanks to be formed upon the faces $k^6$ and $m^7$ $m^7$. A recess $l^3$ is provided in the die L′ to receive the pointed punch $l'$ of the die L.

The dies herein described are designed to stamp in one operation a bottom, top and cap for a tin can. We arrange them in a row and set them in the machine in such a position as to engage the sheet S obliquely to the line of the feed of said sheet. Set in this position in relation to the said sheet, the sheet is punched with the minimum of waste, see Fig. VIII. Were the dies in the row set at right angles to the side edges of the sheet S, the sheet S would have to be wider than this oblique arrangement, and of approximately the same length, entailing a loss of expensive material.

We would not be limited in our invention to the particular construction of the dies herein described, nor to the size, form or number. Also any arrangement of the same can be utilized within the spirit of our invention.

As a means of actuating the ejectors $k'$ and $m^3$, we provide a construction as follows: Caps or plunger heads P are placed within recesses of the die head $J^2$, and in opposition respectively to the heads of the spring posts $k^3$ and $m^4$. Projecting upward from said plunger heads P, P, within suitable bores in said die head J are plungers $p$ $p$. An arm $p'$ is hinged at its rearmost end to the frame of the machine at $p^2$ and at its forward end is attached to a cross arm $p^3$, which slides within a suitable recess in the die head $J^2$. Projecting from the sides of this cross arm $p^3$ are the lugs $p^4$ $p^4$ which lie opposed to the upper end of the plungers $p$, $p$ and are adapted to engage therewith.

Opposed to the upper side of the arm $p'$ is a spring seated post $p^5$, which is secured to a frame $p^6$ and which frame $p^6$ is adjustably secured to the frame A by the adjusting screw $p^7$. By the use of the screw $p^7$ the post $p^5$ can be advanced or retired toward or from the arm $p'$ as may be desired. To secure the frame $p^6$ in its adjustment against the racking induced by the operation of the machine, set screws $p^8$ $p^8$ are used to screw the frame $p^6$ to the frame of the machine. See Figs. VI and VII.

In operation when the dies are thrust downward to make their cut the ejectors $k'$ and $m^3$ are held in a retired position by the action of the spring posts $k^3$ and $m^4$ respectively. When the dies are retired from the cut, however, the die head $J^2$ moves upward in its guides $j^4$ and the arm $p'$ comes into contact with the spring posts $p^5$. This contact forces the forward end of the arm $p'$ downward and the lugs $p^4$ $p^4$ press upon the plungers $p$, $p$, and drive them downward, thereby forcing the plunger heads P, P against the spring posts $k^3$ and $m^4$ and the ejectors downward and beyond the outer face of the cutting dies K M. The springs $p^9$ $p^9$ rest against the top of the lugs $p^4$ $p^4$ and hold them normally against the plungers $p$. They are weaker, however, than the springs of the posts $k^3$ and $m^4$, hence they allow the plungers $p$, $p$ to be held upward by the spring posts $k^3$ and $m^4$, When the blanks are ejected from the dies as just described they are blown from the table by air forced through the tubes R and into the chutes T through which they fall away from the machine.

At Fig. XXIII we illustrate a means of changing the reciprocating action of the punching mechanism and the feeding mechanism of our machine. The gear C′, which, together with the gear E, controls the mechanism by which the sheet S is fed on to the table H, is connected with the driving shaft which governs directly the punching mechanism, by the intermediate gears D' and C², and alterations of the size of the gear C² will change the motion of the feeding mechanism in its relation to that of the punching mechanism. By the use, therefore, of the arm D which is adapted to move in a circle with the shaft of the gear E as its center, and the shaft D journaled near its free end, the gear D' may be moved away from the shaft C to permit the insertion of a different sized gear instead of the gear C². This arm D is secured to the frame of the machine by a clamping screw $d^2$ which engages the frame of the machine in the slot $d'$. At this point of connection $d^2$ we arrange the slot $d'$ which permits the adjustment of the cam D³ to care for the different sized gears C², seated upon the shaft C.

We would not be limited in our invention to the details of construction named herein, and any variation or modification may be made in any of the details for the purpose of commercial economy within the scope of our invention. It is intended within our invention that the table G may be used without the table F, and that the table F may be used without the table G, and that the table H may be used without either of the tables F or G.

We illustrate a brake pulley U fitted on the driving shaft whereby, when the power is released from belt pulley D, the machine may be checked. This is surrounded by a friction brake $u$, controlled by an arm $u'$, connected with one end of the friction brake, and also with the connecting rod $u^2$, which is joined at its other end with the foot pedal $u^4$. The springs $u^2$ and $u^5$ are designed to hold the friction brake $u$ normally free from the brake pulley U.

Any construction of dies may be used, and we here merely illustrate one construction which is well adapted for the particular arrangement in which we wish to set them in their relation to the line of the feed of the sheet. Any number of these may be used and they may be of any size or of any form. The dies described as being placed in a row, which row is set obliquely to the line of the feed of the sheet, is merely a preference, and we would not be limited therein. The dies may be constructed of any desired strength, to accommodate the material to be stamped. The invention is intended to stamp any kind or class of material for die cutting and the expression used herein "sheets of metal and the like," is intended to refer to sheets of any material, metal, paper, felt or whatever kind, which is suitable for die cutting.

What we claim as our invention is:—

1. In a machine for punching blanks from sheets of metal and the like, the combination of a punching mechanism a delivery table and a feed table with means for automatically delivering said sheets to said feed table and automatic means for actuating said delivery table.

2. In a machine for punching blanks from sheets of metal and the like, the combination of a punching mechanism and a feed table with means for delivering said sheets to said feed table, comprising a tilting table lying adjacent to said feed table, a cam affixed to the motive power of said machine, and means of connection between said tilting table and said cam.

3. In a machine for punching blanks from sheets of metal and the like, the combination of a punching mechanism and a feed table with means for automatically delivering sheets to said feed table, consisting of an auxiliary table lying adjacent to said feed table, and automatically operated fingers adapted to move laterally across said auxiliary table and move said sheet on to said feed table.

4. In a machine for punching blanks from sheets of metal and the like, the combination of a punching mechanism and a feed table, with means for automatically delivering sheets to said feed table, consisting of an auxiliary table lying adjacent to said feed table, channels cut laterally in the surface of said auxiliary table, fingers moving across said channels and adapted to move a sheet from said auxiliary table to said feed table and means for automatically actuating said fingers.

5. In a machine for punching blanks from sheets of metal and the like, the combination of a punching mechanism and a feed table, with means for automatically delivering sheets to said feed table, consisting of an auxiliary table lying adjacent to said feed table, channels cut laterally in the surface of said auxiliary table, fingers moving along said channels, and means for actuating said fingers, consisting of a cam connected with the motive power of said machine and means for connecting said cam with said fingers.

6. In a machine for punching blanks from sheets of metal and the like, the combination of a punching mechanism and a feed table with means for maintaining sheets upon said feed table in an advanced position toward said punching mechanism consisting of dogs adapted to engage said sheet and means to oscillate said dogs, consisting of a rock shaft to which said dogs are attached, a bell crank lever attached to said rock shaft and mounted on another rock shaft and a connecting rod joining said bell crank lever to the driving shaft of said machine.

7. In a machine for punching blanks from sheets of metal and the like the combination with a punching mechanism of a feeding mechanism consisting of a feed table coöperating angle blocks and gripping dogs adapted to grip the said sheets and carry them laterally along the said feed table to the said punching mechanism and means for actuating said angle blocks and dogs.

8. In a machine for punching blanks from sheets of metal and the like, the combination with a punching mechanism, of a feeding mechanism, consisting of a feed table, gripping dogs, angle blocks, coöperating with said dogs, guides fitted in said table in which said angle blocks are adapted to move, and means for automatically moving said angle blocks in said guides.

9. In a machine for punching blanks from sheets of metal and the like, the combination with a punching mechanism, of a feeding mechanism consisting of a feed table, channeled guides, fitted therein, coöperating gripping dogs and angle blocks, said angle blocks being adapted to engage said channeled guides, and means for moving said angle blocks in said guides, consisting of a rock shaft, a bell crank lever mounted thereon, a crank pin attached to the driving shaft of said machine, and means of effecting connection between said crank pin and one end of said bell crank lever, and between the other arm of said bell crank lever and said coöperating gripping dogs and angle blocks.

10. In a machine for punching blanks from sheets of metal and the like, the combination with a feed table, and a plurality of dies arranged in a row obliquely to the line of feed of said feed table of means of effecting said feed, consisting of gripping dogs and angle blocks, coöperating therewith, adapted to alternately grip and release said sheet, and means for moving said gripping dogs and angle blocks across the face of said feed table.

11. In a machine for punching blanks from sheets of metal and the like, the combination with a feed table and a plurality of dies arranged in a row obliquely to the direction of feed of the said table, of means for feeding the said sheets from said table, consisting of gripping dogs and coöperating angle blocks adapted to successively grip said sheets and carry them along the face of said table a fixed distance, then release them, move back to their original position.

12. In a machine for punching blanks from sheets of metal and the like, the combination with a row of dies, and a feed table of means for feeding sheets successively along the face of the said feed table, in an oblique direction to the said row of dies, and means for maintaining a fixed distance between each two of the said sheets.

13. In a machine for punching blanks from sheets of metal and the like, the combination with a plurality of dies arranged in a row, and a feed table, of means for feeding the said sheets obliquely to the said row of dies, consisting of gripping dogs and coöperating angle blocks, having engagement with the said feed table, and adapted to move automatically toward said dies in an oblique direction to the said row.

14. In a machine for punching blanks from sheets of metal and the like, the combination with a punching mechanism of a feeding mechanism consisting of a feed table, of gripping dogs and coöperating angle blocks adapted to grip said sheets successively and carry them across the face of said feed table to said punching mechanism, and means for automatically delivering said sheets to said feed table in succession and at a fixed distance apart.

15. In a machine for punching blanks from sheets of metal and the like, the combination with a punching mechanism, and a feeding mechanism, of means for delivering said sheets successively to said feeding mechanism, consisting of a table, adjacent to said feeding mechanism, fingers moving laterally across said table, and means for actuating said fingers, whereby successive sheets are delivered to said feeding mechanism at a fixed distance apart.

FINLAY McINTYRE.
JAMES W. ROGERS.

Witnesses:
HARRY J. MATTESON,
HENRY E. STAFFORD.